UNITED STATES PATENT OFFICE.

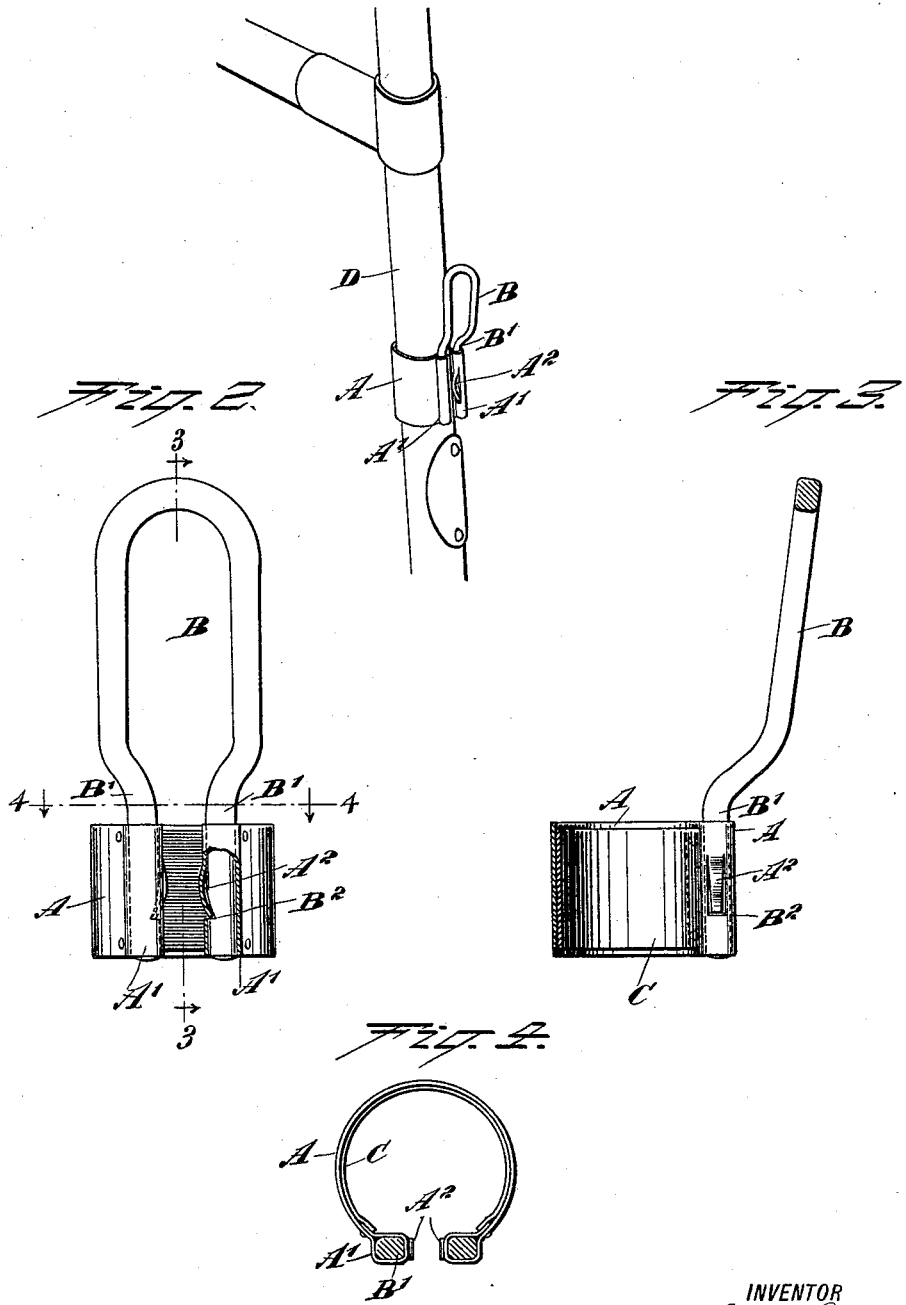

JOSEPH MILLER BROWN, OF NANAIMO, CANADA.

LAMP-BRACKET.

SPECIFICATION forming part of Letters Patent No. 582,978, dated May 18, 1897.

Application filed November 18, 1896. Serial No. 612,628. (No model.)

*To all whom it may concern:*

Be it known that I, JOSEPH MILLER BROWN, a subject of the Queen of Great Britain, residing at Nanaimo, in the Province of British Columbia and Dominion of Canada, have invented a new and Improved Lamp-Bracket, of which the following is a full, clear, and exact description.

The object of the invention is to provide a new and improved lamp-bracket more especially designed for use on bicycles and arranged to permit of conveniently securing it to the frame of the bicycle or removing it therefrom whenever desired.

The invention consists of certain parts and details and combinations of the same, as will be fully described hereinafter and then pointed out in the claims.

Reference is to be had to the accompanying drawings, forming a part of this specification, in which similar characters of reference indicate corresponding parts in all the figures.

Figure 1 is a perspective view of the improvement as applied. Fig. 2 is an enlarged front view of the improvement with part broken out. Fig. 3 is a sectional side elevation of the same on the line 3 3 of Fig. 2, and Fig. 4 is a sectional plan view of the same on the line 4 4 of Fig. 2.

The lamp-bracket consists of a band A and a bracket B, formed of a single piece of steel, bent approximately U-shaped, with legs B' polygonal in cross-section and engaging similarly-shaped eyes A', formed at the ends of the band A. The latter is preferably lined with a piece C of rubber, cloth, or other suitable material and engaging the steering-head D or other part of the bicycle above or below the name-plate, as indicated in Fig. 1. Each of the eyes A' is formed with a spring-tongue $A^2$, adapted to engage with its lower free end a shoulder or notch $B^2$, formed on the corresponding leg B', so that when the bracket B engages with its legs B' the eyes A' then the spring-tongues $A^2$ finally snap into the shoulders or notches $B^2$, so as to prevent a withdrawal of the bracket B from the said eyes unless the operator first moves the spring-tongues $A^2$ outwardly out of engagement with the said notches.

The legs B' stand at an angle to the body portion of the bracket B, as is plainly indicated in Fig. 3, to permit of conveniently fastening the lamp in place and holding the same in such position as to throw the rays of light in the proper direction. By making the legs B' polygonal in cross-section and the eyes A' of a similar shape I prevent the lamp from being twisted to one side, as would be the case if the legs B' were round.

It will be seen that in assembling the several parts the band A is placed, with its lining C, around the steering-head D, and then the bracket-legs B' are pushed into the eyes A', drawing the band A firmly in place and finally locking the legs B' in place, the tongues $A^2$ engaging the shoulders $B^2$, and thus very secure attachment is obtained.

It is understood that the legs B' are so arranged relative to the eyes of the inclosing band A that the operator must press or spread the legs apart to bring the same in register with the eyes, and when the legs are finally pushed into the eyes and the operator permits the legs to move toward each other, owing to the resiliency of the steel of which the bracket is made, then the band is drawn very tightly onto the steering-head to securely hold the entire lamp-bracket and the lamp in place.

The device is simple in construction, strong, light, and handsome, and has no unsightly and expensive lugs, bolts, fastenings, or hinges. It can be easily and entirely detached from the bicycle in a few seconds by withdrawing the spring lamp-bracket from the band and can be replaced on the bicycle as easily by slipping the sheet-metal band around the bicycle-head and sliding in the spring lamp-bracket, when it will hold itself and the lamp securely, and this lamp-bracket being polygonal cannot be twisted to one side. The device does not injure the enamel of the bicycle, and it will fit any lamp not provided with its own bracket and without alteration fit bicycles with brake-rods in front.

Having thus fully described my invention, I claim as new and desire to secure by Letters Patent—

1. A bicycle-lamp bracket, comprising the band arranged to encircle the tubing of the frame and having its ends formed with eyes polygonal in cross-section; and the U-shaped spring-bracket to which the lamp is attached and having legs shaped corresponding to said eyes in which they are received, the tension of said legs securing said band upon the tubing, as set forth.

2. A lamp-bracket, comprising a band arranged to encircle the article upon which the lamp is to be held and formed at its ends with vertically-disposed eyes polygonal in cross-section and having spring-tongues located therein, and the U-shaped spring-bracket arranged to receive the lamp thereon and having its legs polygonal in cross-section and formed with notches, said legs being received in said eyes, having their notches engaged by said tongues, and securing said band upon the article by spring-tension, as and for the purpose set forth.

JOSEPH MILLER BROWN.

Witnesses:
 GEO. J. SEVILOCKWAY,
 JAS. S. KNARSTON.